May 26, 1970 J. VAN DER HEYDEN 3,513,865
FLUID VORTEX VALVE
Filed Dec. 30, 1966
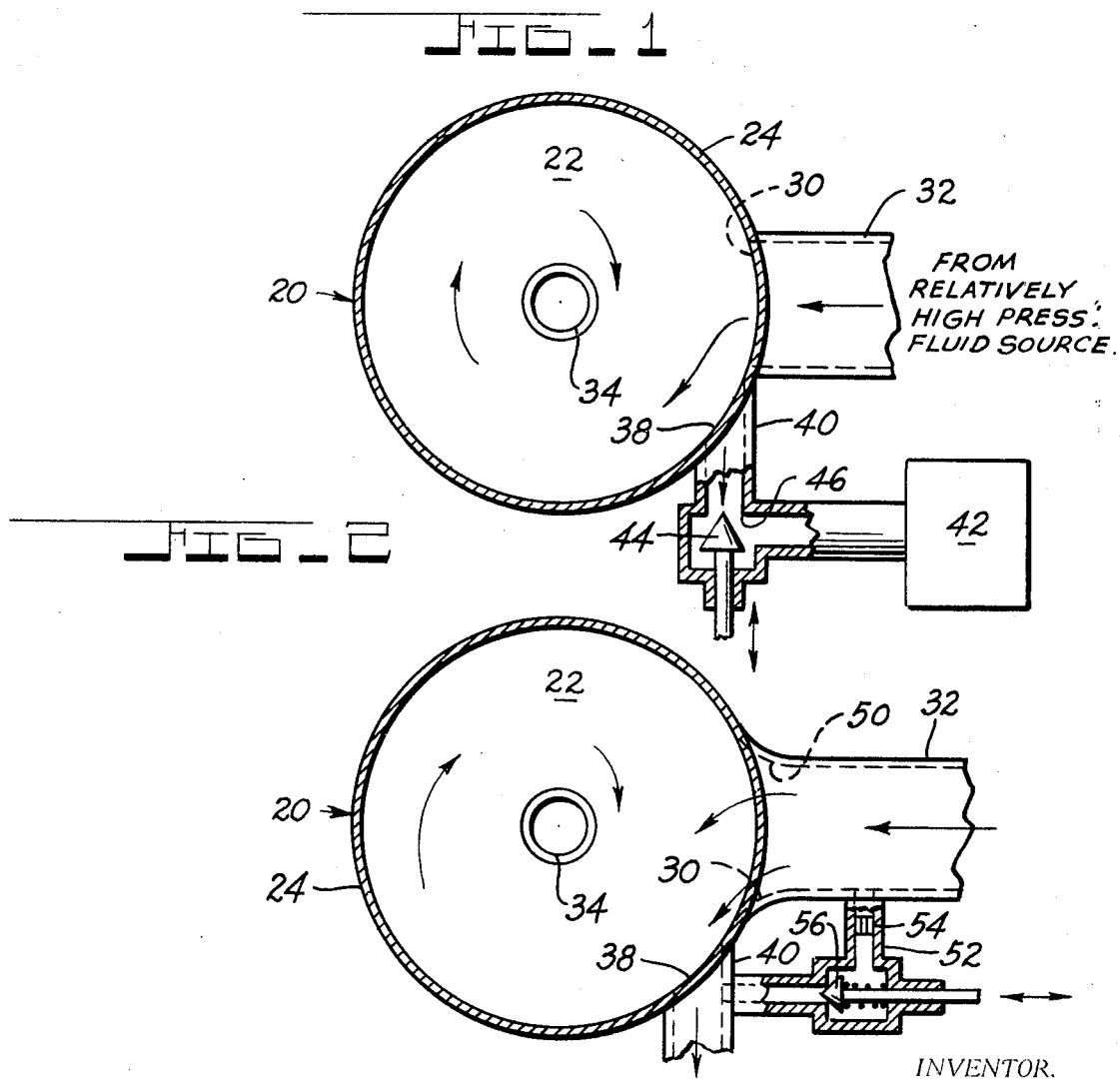
INVENTOR.
JACQ VAN DER HEYDEN.
BY
Gordon N. Cheney
AGENT.

3,513,865
FLUID VORTEX VALVE
Jacq Van Der Heyden, Orlando, Fla., assignor to The Bendix Corporation, a corporation of Delaware
Filed Dec. 30, 1966, Ser. No. 606,408
Int. Cl. F15c 1/16
U.S. Cl. 137—81.5                                   6 Claims

ABSTRACT OF THE DISCLOSURE

The present invention concerns a fluid vortex valve having a circular vortex chamber provided with a circumferentially located relatively high pressure, large flow, fluid inlet adapted to inject fluid radially inwardly, a centrally located outlet port adapted to pass the injected fluid outwardly from the chamber and a relatively low pressure fluid drain control port positioned adjacent the fluid inlet port which may be opened to establish a fluid pressure unbalance transverse to the inlet port thereby causing the fluid flow to deviate toward the arcuate chamber wall and assume a vortex path thereby impeding fluid flow through the chamber.

---

This invention relates, in general, to fluid flow control devices of the pure fluid type.

Pure fluid devices such as fluid vortex valves are a relatively recent development in the fluid control art. The advantages of the same relative to mechanical and electronic fluid control devices are significant and development of such devices is progressing at a rapid pace as will be appreciated by those persons skilled in the appropriate art. The present invention is an improvement over the conventional fluid vortex valve shown and described in U.S. Pat. No. 3,195,303, issued July 20, 1965, to G. M. Widell (common assignee) and reference is made to the same for additional details of fundamental operation of a fluid vortex valve.

A disadvantage of the conventional fluid vortex valve as represented in said Pat. No. 3,195,303 is that the control fluid flow injected into the vortex chamber must be at a higher pressure level than the supply fluid discharged by the main inlet port to the vortex chamber to effect the desired vortex action upon which the pressure and flow of the supply fluid at the outlet port depends. As a result of the relatively higher pressure control flow the maximum recoverable pressure of the supply fluid at the outlet port is somewhat less than the supply fluid pressure discharged from the inlet port. Furthermore, as in the case of any fluid flow control system problems related to fluid seals and the like increase in proportion to the fluid pressure level of the system. It is, therefore, an object of the present invention to provide a fluid vortex valve wherein the pressure level of a controlled fluid source is less than the pressure level of a main fluid supply controlled thereby.

It is another object of the present invention to provide a fluid vortex valve wherein the recoverable output fluid pressure of the controlled supply of pressurized fluid flow is maximized.

Other objects and advantages of the present invention will be apparent from the following description taken with the accompanying drawings wherein:

FIG. 1 is a side view of the present invention;
FIG. 2 is a sectional view taken on line 2—2 of FIG. 1;
FIG. 3 is a sectional view similar to FIG. 2 showing a modified form of the present invention.

Referring to FIGS. 1 and 2, numeral 20 designates a so-called monostable fluid vortex valve having a circular chamber 22 defined by a circular wall portion 24 and parallel spaced apart wall portions 26 and 28 secured to wall portion 24 by any suitable fastening means, not shown, providing a fluid tight seal. A fluid inlet port 30 in the wall portion 24 is connected to a supply source of substantially constant, relatively high pressure fluid, not shown, by a conduit 32. Axially aligned fluid outlet ports 34 and 36 are centrally located in wall portions 26 and 28, respectively. The outlet port 36 is larger than outlet port 34 and the total effective flow area of both outlet ports 36 and 34 is less than the flow area of inlet port 30.

A control fluid port 38 in wall portion 24 adjacent inlet port 30 is connected via conduit 40 to a pressurized fluid source generally indicated by 42 which is maintained at a lower pressure than the above-mentioned supply source. A flow control valve 44 engageable with a seat 46 in series flow relationship with conduit 40 serves to control the effective flow area of conduit 40. The valve 44 may be manually actuated or automatically actuated by suitable control means, not shown, responsive to a variable condition of operation. The outlet port 34 is connected by a conduit 48 to suitable fluid pressure responsive control means, not shown, which may include a spring loaded pressure responsive diaphragm or some similar conventional device adapted to provide a useable output position signal, for example. The outlet port 36 may be vented to ambient air pressure or other suitable relatively low drain pressure thereby providing for continuous flow through chamber 22. Outlet port 36 may be eliminated in the event of the conduit 48 and associated pressure responsive control means, not shown, providing a continuous flow circuit. However, considering the spring loaded fluid pressure responsive diaphragm as establishing a dead ended flow circuit, the outlet port 36 is necessary.

Referring to FIG. 3, the fluid vortex valve 20 is shown modified from FIG. 1 to provide bistable valve action. To that end, the inlet port 30 is provided with a diverging curved wall portion 50 which merges with the curved inner wall of portion 24 to provide substantially undisturbed flow circulation from inlet port 30 toward wall portion 24 thereby enabling the fluid stream to "lock on" the adjacent wall portion 24 as will be described below.

OPERATION

Referring to FIGS. 1 and 2, it will be assumed that valve 44 is seated against seat 46 thereby blocking conduit 40. Relatively high pressure supply fluid issues from inlet port 30 and passes radially inwardly through chamber 22 to outlet ports 34 and 36. The combined effective flow areas of outlet ports 34 and 36 are less than that of inlet port 30 so that the fluid passing through chamber 22 does not undergo any significant pressure drop. The fluid pressure signal at outlet port 34 is transmitted via conduit 48 to the control means, not shown, which responds accordingly.

The valve 44 is actuated to an open position in response to an input signal applied thereto, thereby establishing a flow area of conduit 40 which is a function of the input signal. The resulting low pressure area created adjacent inlet port 30 causes the supply fluid stream issuing from inlet port 30 to deviate accordingly toward the low pressure area and progress in a vortex pattern through chamber 22 as shown by the arrows in FIG. 2. An impedance to fluid flow through chamber 22 is generated by the fluid vortex, which impedance increases as the tangential velocity of the fluid vortex increases thereby causing the fluid to undergo a weight flow-rate decrease and a corresponding fluid pressure drop at the vortex center as it passes to outlet ports 34 and 36. The outlet port 34 being collinear with the vortex axis transmits the reduced fluid pressure to the control means, not shown, via conduit 48. As the valve 44 moves in response to variations in the input signal applied thereto to establish a greater effective flow area of conduit 40, a corresponding lower fluid pressure is established adjacent to inlet port 30 which, in turn, increases the transverse pressure unbalance across the supply fluid stream thereby urging the same closer to control port 38 to effect a corresponding increase in radius of vortex flow. The resulting increase in tangential velocity of the vortex flow increases flow impedance through chamber 22 which, in turn, reduces the weight flow-rate through chamber 22 and thus the fluid pressure at outlet port 34. In the above-mentioned manner, the fluid pressure at outlet port 34 and thus the output pressure transmitted through conduit 48 to the control means, not shown, is controlled to vary in proportion to the input signal imposed on valve 44. It will be understood that the valve 44 may be closed to eliminate the low pressure area adjacent control port 30 thereby allowing the supply fluid stream to return to a radially inwardly path from inlet port 30 to outlet ports 34 and 36 with little or no pressure drop.

Referring to FIG. 3, it will be assumed that valve 44 is in its closed position thereby blocking conduit 40. The supply fluid stream issued by inlet port 30 passes radially inwardly from chamber 22 to outlet ports 34 and 36 with little or no pressure drop as in the case of FIG. 2.

Unlike FIG. 2, the valve 44 of FIG. 3 will be considered a two position valve, fully open or fully closed, depending upon the existence of a suitable input signal imposed thereon. In the open position, valve 44 communicates control port 38 with the relatively lower pressure fluid source 42 whereupon, as in the case of FIG. 2, a low pressure area is established adjacent inlet port 30. The fluid stream from inlet port 30 bends accordingly toward control port 38 and passes with substantially undisturbed flow over the curved wall portion 50 and along the inner wall of portion 24 thereby generating a vortex flow as the fluid passes to outlet ports 34 and 36. The valve 44 may be held in an open position temporarily in response to timed duration of the input signal imposed thereon in which case the valve 44 returns to its closed position thereby eliminating the low pressure area. However, the fluid stream remains attached or "locked on" to the wall portion 24 as a result of the well-known "Coanda" effect whereby the fluid flow entering chamber 22 generates a low pressure area between the fluid stream and adjacent wall portion 24 which tends to hold the fluid stream in its displaced condition. As in the case of FIG. 2, the fluid vortex generated in the chamber 22 provides impedance thereby reducing the weight rate of flow through chamber 22 causing a corresponding drop in pressure and flow at outlet port 34.

If desired, the fluid stream may be detached from wall portion 24 causing it to revert back to a radially inwardly flow path by various control means. For example, a conduit 52 having a restriction 54 therein may communicate conduit 40 intermediate valve 44 and control port 38 with conduit 32. A spring loaded valve 56 and conduit 52 downstream of restriction 54 may be normally held in a closed position and temporarily actuated to an open position by suitable conventional control means, not shown, responsive to a suitable input signal to permit passage of a pulse of relatively high pressure fluid from conduit 32 to control port 38. The pulse of relatively high pressure fluid at control port 38 will tend to destroy the low pressure area holding the fluid stream in the "locked on" position causing the fluid stream to switch to a radially inward path.

I claim:

1. A fluid flow control device comprising:
   casing means defining a circular chamber;
   a source of pressurized fluid;
   an outlet port in said casing means coaxially arranged relative to said circular chamber for venting pressurized fluid from said chamber;
   an inlet port operatively connected to said source and said chamber and adapted to inject pressurized fluid radially inwardly into said chamber;
   a source of fluid at lower pressure relative to the fluid pressure in said chamber;
   a control fluid port operatively connected to said source of relatively lower pressure fluid and said chamber adjacent said inlet port;
   positionable valve means operatively connected to said control fluid port and responsive to an input signal for controlling the effective flow area of said control fluid port in response to said input signal;
   said valve means being operative to vent said control port to said source of relatively lower fluid pressure to thereby deflect said radially inwardly injected pressurized fluid toward said control port thereby causing the pressurized fluid flow to assume a vortex pattern in passing through said chamber to said outlet port;
   said vortex flow generating an impedance to fluid flow through said chamber and a corresponding pressure drop at said outlet port.

2. A fluid flow control device as claimed in claim 1 wherein: said fluid injected by said inlet port reverts to radially inwardly flow in response to closing of said valve means.

3. A fluid flow control device as claimed in claim 1 wherein: said valve means is actuated to an open position to vent fluid from said chamber to said relatively lower pressure fluid source and establish a transverse fluid pressure differential on said radially injected pressurized fluid to deflect the same.

4. A fluid flow control device as claimed in claim 3 wherein: said valve means is actuated in an opening direction to increase the flow through said control port thereby increasing said transverse fluid pressure differential and the deflection of said injected pressurized fluid accordingly.

5. A fluid flow control device as claimed in claim 1 wherein:
   said valve means is a two position valve having a closed position and an open position;
   said inlet port is provided with a diverging wall portion which merges with the curved inner wall portion of said circular chamber to promote substantially undisturbed flow of said deflected fluid into said chamber whereby said fluid flow remains attached to the curved inner wall of said chamber subsequent to closing of said valve means; and
   means operatively connected to said control port for injecting a controlled pulse of pressurized fluid into said chamber to detach said fluid stream from said curved inner wall of said chamber whereupon said fluid stream reverts back to radially inwardly flow.

6. A fluid flow control device as claimed in claim 1 wherein: said relatively lower pressure fluid source is at atmospheric pressure.

References Cited

UNITED STATES PATENTS

| | | | |
|---|---|---|---|
| 3,001,539 | 9/1961 | Hurvitz | 137—81.5 |
| 3,144,309 | 9/1964 | Sparrow | 137—81.5 X |
| 3,187,763 | 6/1965 | Adams | 137—81.5 |
| 3,192,938 | 7/1965 | Bavel | 137—81.5 |
| 3,335,737 | 8/1967 | Gesell | 137—81.5 |
| 3,267,946 | 8/1966 | Adams et al. | 137—81.5 |
| 3,324,891 | 6/1967 | Rhoades | 137—81.5 X |
| 3,358,477 | 12/1967 | Heskestad | 137—81.5 X |
| 3,366,370 | 1/1968 | Rupert | 137—81.5 X |

M. CARY NELSON, Primary Examiner

W. R. CLINE, Assistant Examiner